United States Patent [19]

Gurney

[11] Patent Number: 5,709,908
[45] Date of Patent: *Jan. 20, 1998

[54] STRIPPING COMPOSITION AND METHOD FOR STRIPPING A ROAD OR HIGHWAY SURFACE

[75] Inventor: Richard S. Gurney, Roseville, Minn.

[73] Assignee: Barbara Ann Gurney, Roseville, Minn.

[*] Notice: The term of this patent shall not extend beyond the expiration date of Pat. No. 5,478,596.

[21] Appl. No.: 545,878

[22] Filed: Oct. 20, 1995

Related U.S. Application Data

[63] Continuation of Ser. No. 242,135, May 13, 1994, Pat. No. 5,478,596.

[51] Int. Cl.$^6$ ............................................. B05D 5/10
[52] U.S. Cl. .................... 427/137; 427/136; 427/395.5; 427/424; 427/286
[58] Field of Search ............................. 427/136, 137, 427/286, 385.5, 421; 350/105

[56] References Cited

U.S. PATENT DOCUMENTS

| | | |
|---|---|---|
| 2,897,732 | 8/1959 | Shuger . |
| 2,897,733 | 8/1959 | Shuger . |
| 3,326,098 | 6/1967 | Boettler . |
| 3,782,843 | 1/1974 | Eigenmann ............................ 404/9 |
| 3,914,468 | 10/1975 | Condon et al. ..................... 427/136 |
| 4,025,476 | 5/1977 | Miller et al. ........................ 427/137 |
| 4,031,048 | 6/1977 | Holmen et al. ...................... 260/22 |
| 4,088,633 | 5/1978 | Gurney .............................. 260/47 EN |
| 4,165,808 | 8/1979 | McKenzie ........................... 427/137 |
| 4,185,132 | 1/1980 | Gurney ............................... 427/137 |
| 4,255,468 | 3/1981 | Olson ................................. 427/137 |
| 4,288,487 | 9/1981 | Eigenmann ......................... 427/137 |
| 4,387,194 | 6/1983 | Ottavianai et al. .................. 528/49 |
| 4,415,603 | 11/1983 | Valiot et al. ........................ 427/541 |
| 4,575,278 | 3/1986 | Whitney ............................. 404/72 |
| 4,604,418 | 8/1986 | Shindo et al. ...................... 524/296 |
| 4,731,415 | 3/1988 | Fujita et al. ........................ 525/44 |
| 4,740,577 | 4/1988 | DeVoe et al. ...................... 628/51 |
| 4,794,147 | 12/1988 | Savino et al. ...................... 525/454 |
| 5,115,086 | 5/1992 | Hseih ................................ 528/272 |
| 5,124,178 | 6/1992 | Huenggi et al. .................... 427/137 |
| 5,130,364 | 7/1992 | Chen ................................. 524/472 |
| 5,159,045 | 10/1992 | Haseyama et al. ................. 525/131 |
| 5,167,705 | 12/1992 | Couglin ............................. 427/137 |
| 5,221,743 | 6/1993 | Goldstein et al. .................. 544/198 |
| 5,247,048 | 9/1993 | Meixner et al. ................... 528/272 |

OTHER PUBLICATIONS

Edward P. Squiller, "Catalysis in Aliphatic Isocyanate–Alcohol Reactions", reprinted from Modern Paint and Coatings, Jun. 1987.
Dow Resin 565, pp. 1–6, and Material Safety Data Sheet (date unknown).
A Guide to Glycols, The Dow Chemical Company, Chemistry of Glycols, 1981, pp. 9–11 (date unknown).
Tolonate, Rhone–Poulenc, Tolonate Aliphatic Polyisocyanates for Non–Yellowing Polyurethane Systems, p. 3 (date unknown).
Miles Material Safety Data Sheet, Mar. 8, 1991, pp. 1–10.
OxyChem Material Safety Data Sheet, Feb. 16, 1990, pp. 1–8.
OxyChem Electrochemicals & Specialty Products, Chlorowax LV (date unknown).
BASF Corporation Polymers Division, Material Safety Data Sheet, Aug. 26, 1991, pp. 1–11.
OM Group, Inc., Metal Specialty Chemicals For Industry, Feb. 3, 1992, pp. 1–4.
Kronitex TCP (Tricresyl; Phosphate), Material Safety Data Sheet (date unknown).

*Primary Examiner*—Janyce Bell
*Attorney, Agent, or Firm*—Merchant, Gould, Smith, Edell, Welter & Schmidt

[57] ABSTRACT

The disclosed striping composition provides a fast cure on road or highway surfaces. The striping composition is a two-part (part A and part B) polyurethane forming system having good adhesion characteristics to a road or highway surface, and weathering and yellowing resistance over time. Part A contains an aliphatic polyol and part B contains an aliphatic polyisocyanate.

15 Claims, No Drawings

STRIPPING COMPOSITION AND METHOD FOR STRIPPING A ROAD OR HIGHWAY SURFACE

This is a continuation of application Ser. No. 08/242,135, filed May 13, 1994, which issued as U.S. Pat. No. 5,478,596 on Dec. 26, 1995, the entire disclosure of which is incorporated herein by reference.

FIELD OF THE INVENTION

This invention relates to a striping composition for use on a road or highway surface, a method for striping or marking a road or highway surface, and the resulting striped or marked road or highway. The striping composition is a two-part polyurethane forming system having fast cure properties; good adhesion characteristics to a road or highway surface; good weathering and abrasion resistance; and ambering resistance over time.

BACKGROUND OF THE INVENTION

Various striping or marking compositions have been used on roads and highways for many years. The first class of striping compositions used on roads and highways with some success were alkyd-based paint compositions such as those disclosed in U.S. Pat. Nos. 2,897,732; 2,897,733; and 3,326,098. Alkyd-based paint compositions are generally slow to dry and contain ester linkages which are susceptible to hydrolysis from the alkaline condition of roads. This hydrolysis, in part, causes the applied paint to have poor wear resistance. Accordingly, it is desirable to provide a striping composition having a much faster cure time and improved wear resistance.

Most alkyd-based paint compositions require the addition of a solvent or drying oil to decrease the viscosity so that the paint composition can be sprayed onto road surfaces. For example, see U.S. Pat. No. 3,326,098. The presence of a solvent during highway marking creates a pollution problem since the solvent evaporates into the atmosphere. Accordingly, it is desirable to provide a striping composition which is 100% solids, and does not contain solvents or drying oils.

As an alternative to alkyd-based paint compositions, solvent free epoxy-based striping compositions were developed. Epoxy-based striping compositions are described in detail in U.S. Pat. Nos. 4,088,633; 4,185,132; and 4,255,468. These striping compositions are a significant improvement over prior alkyd-based paints in terms of alkaline and wear resistance, and in reducing the need for solvents during application. In particular, the epoxy-based striping compositions are better at withstanding water immersion compared with the alkyds. In addition, they provide a better bond to glass beads dropped thereon which is important for providing retroreflectivity at night. Increased adhesion to glass beads provides better retention of the glass beads to the road surface for a longer period of time. Epoxy-based striping compositions, however, are still generally too slow in curing, particularly on a cold road surface. In addition, they age harden and become brittle, and have a tendency to amber. As a result of the slow curing rate for such epoxy-based striping compositions, it is necessary to put cones along the striping composition applied to a road surface to prevent cars traveling along the road from tracking the uncured composition. The necessity for coning while the epoxy-based striping composition cures increases the cost of striping a road by requiring a number of cones sufficient to prevent cars and trucks from tracking the striping composition before it cures, and by providing the necessity for employing crews to put the cones down once the striping composition is applied and to pick the cones up once it cures. Accordingly, it would be desirable to stripe a road with a composition that is fast cure, even on cold road surfaces, in order to eliminate the need for coning and thereby enhance striping efficiency.

Furthermore, it would be desirable to provide a fast cure striping composition having good adhesion characteristics to road or highway surfaces and which can withstand weathering and which will not significantly amber over time.

SUMMARY OF THE INVENTION

A striping composition for use on a road or highway surface, a method for striping a road or highway surface, and a striped road or highway surface are provided by the present invention. The striping composition has fast cure properties, has good adhesion characteristics to a road or highway surface; good weathering and abrasion resistance; and ambering resistance over time.

The striping composition for use on a road or highway surface according to the present invention is prepared from a two-part polyurethane forming system containing a first part (part A) and a second part (part B). Part A contains an isocyanate-reactive group-containing component and part B contains an isocyanate group-containing component. Parts A and B react to form a polyurethane system.

Part A of the polyurethane forming system can contain any polyol capable of reacting with the polyisocyanate in part B. The polyol component is selected based upon the desired properties of the final polyurethane composition, which include adhesiveness, amber resistance, strength and flexibility, and upon the desired properties of part A, which include viscosity and reactivity. In order to provide these properties, the polyol component can be a mixture of polyols. Polyols useful in part A preferably include compounds and polymers which are diols, triols, and tetraols. The hydroxyl groups can be primary, secondary or tertiary.

The polyol compounds and polymers can be glycols, alkane polyols which are lower ($C_1$–$C_{10}$) or higher ($C_{11}$–$C_{30}$), polyether polyols, epoxy resins, and monosaccharides. Preferably, part A contains a mixture of polyols such as, for example, a mixture of a secondary diether diol and a lower polyalkylene glycol. Preferably, the secondary diether diol is the diether of propylene glycol and bisphenol A, and the lower polyalkylene glycol is tripropylene glycol.

Part B of the polyurethane system can be any polyisocyanate capable of reacting with the polyol in part A to provide a fast cure striping composition having a desirable degree of adhesion to a road or highway surface, strength and flexibility, and amber resistance over time, and which will provide a part B having a desired degree of reactivity and a viscosity sufficient for processing in commercial striping or marking machinery without the use of solvents. Mixtures of polyisocyanates can be used. Aliphatic and cycloaliphatic polyisocyanate are desirable because they tend to produce polyurethanes having decreased ambering. Trimerized hexamethylene diisocyanate (HDI), a trifunctional isocyanurate, is a preferred aliphatic polyisocyanate. In order to increase the reactivity and decrease the viscosity of part B, and provide a harder polyurethane, any colorless or lightly colored aromatic polyisocyanates can be used in combination with the aliphatic or cycloaliphatic polyisocyanate. Diphenyl methane diisocyanate (e.g., diphenyl methane-2, 4'- and/or -4,4'-diisocyanate) is a preferred aromatic polyisocyanate because it is very lightly colored. This aromatic polyisocyanate component is particularly advantageous when it is combined with trimerized hexamethylene diisocyanate.

Generally, if the striping composition is uncured, either parts A and B have not been combined or parts A and B have been combined but the combination has not resulted in a cured polyurethane system. While the striping composition is uncured, reflectorizing filler can be added thereto to provide a cured striping composition having desired retroreflectivity.

The present invention provides a method for striping a road or highway surface which involves combining part A containing isocyanate-reactive group-containing components and part B containing isocyanate group-containing components to form a reacting striping composition, applying the reacting striping composition to a road or highway surface, and allowing the reacting striping composition to cure and adhere to the road or highway surface. If desired, reflectorizing filler can be added to the reacting striping composition to provide a striped road or highway surface having retroreflectivity effect.

Parts A and B can be applied to a road or highway surface using an applicator which can be a commercially available striping or marking apparatus to form a film on the road or highway surface. Generally, the film will have a thickness of about 4 mm to about 20 mm depending on whether reflectorizing filler is incorporated therein.

DETAILED DESCRIPTION OF THE INVENTION

The striping composition of the invention can be 100% solids. The term "solids" in this context is borrowed from paint chemistry, wherein "solids" includes any components (be they liquid or solid) which becomes a part of the ultimately obtained solid coating. That is, the term "solids" excludes essentially volatile solvents or carriers. The phrase "essentially volatile" is meant to include a liquid which has a boiling point or initial boiling point below 150° C. at normal atmospheric pressure.

The striping composition can have fast cure properties. The phrase "fast cure" has been used in the prior art to describe a striping composition having a "no track time" of about 5–10 minutes at room temperature. See U.S. Pat. No. 4,255,468. As used herein, the phrase "fast cure" is intended to describe a striping composition which achieves a "no track time" in at least about four minutes at room temperature. The "no tracking time" is defined as the amount of time necessary for the striping composition, once applied to a road or highway surface, to cure to an extent sufficient to resist tracking by standard automobile and truck traffic. Preferably, the no track time is an amount of time sufficient to eliminate the need for coning to prevent tracking without significantly disrupting regular traffic patterns. More preferably, the no track time is less than 2 minutes, even more preferably 10 seconds to about 50 seconds, and most preferably, about 20 seconds to about 40 seconds at 75° F.

It is desirable for the striping composition to be relatively "no track." "Instant no track" may be possible from an application and curing standpoint but it is usually desirable to have an "open time" to both wet the surface of the road or highway and to receive the glass beads. If the curing polymerization is too rapid, the resulting striping composition has too much cohesion and not enough adhesion to the road or highway surface. Although it is desirable to decrease no track time, it should not be so short as to seriously sacrifice adhesion to a road or highway surface. For most applications, a no track time of 20 or 30 seconds is sufficient to provide adequate adhesion at room temperature (75° F.). On cold surfaces, it may be desirable to provide a longer no track time in order to provide sufficient adhesion to the road or highway surface. While providing fast cure properties, the striping composition of the present invention adheres sufficiently well to a road or highway surface so that it has a long life expectancy and can resist peeling or abrasion caused by traffic including snow plows.

The striping composition can be applied to any type of road surface. Preferably, the road surface is made of asphalt or concrete upon which the striping composition of the present invention adheres very well since it is porous. Although the striping composition adheres well to most road or highway surfaces, it can adhere slightly to other less porous surfaces such as metal. This property helps prevent the striping composition from adhering to the applicator. If desired, the striping composition can be applied to a porous road surface with as much force as desired to ensure sufficient adhesion thereto.

Part A System

This invention contemplates the use of an isocyanate-reactive group-containing component (part A) capable of reacting with the isocyanate group-containing component contained in part B to provide a fast cure striping composition. The isocyanate-reactive group-containing component preferably contains polyols or thiols. The polyol component is selected based upon the desired properties of the final polyurethane composition, which include adhesiveness, amber resistance strength and flexibility, and upon the desired properties of part A, which include viscosity and reactivity. In order to provide these properties, the polyol component can be a mixture of polyols. Exemplary polyols which can be used to form non-yellowing or non-ambering polyurethanes are generally described in U.S. Pat. Nos. 4,604,418 and 5,159,045, which are incorporated herein by reference. These polyols include compounds and polymers which are diols, triols, and tetraols.

The compounds and polymers include, for example, glycols such as ethylene glycol, propylene glycol, β,β-dihydroxyethyl ether (diethylene glycol), dipropylene glycol, 1,4-butylene glycol, 1,3-butylene glycol, 1,6-hexamethylene glycol, neopentyl glycol, polyethylene glycol, polypropylene glycol, polypropylene-polyethylene glycol and polybutylene glycol; alkane polyols such as glycerol, trimethylolpropane, hexanetriol, pentaerythritol, xylitol and sorbitol; polyether polyols obtained by addition polymerization of a single compound or a mixture of alkylene oxide such as ethylene oxide, propylene oxide and 1,2-butylene oxide to a single compound or a mixture of polyhydric alcohols such as glycerol and propylene glycol or polyfunctional compounds such as ethylene diamine and ethanolamine; epoxy resins of novolak type, β-methylepichloro type, cyclooxirane type, glycidyl ether type, glycidyl ester type, glycol ether type, epoxylated unsaturated fatty acid type, epoxylated fatty acid ester type, polybasic carboxylic acid ester type, amino-glycidyl type, halogenated type and resorcinol type; and monosaccharides or derivatives thereof selected from fructose, glucose, saccharose, lactose or 2-methylglucoxide.

For most applications, however, polyols containing ester groups are not preferred because they tend to hydrolyze in the presence of alkaline present on road surfaces. Unsaturation also tends to hydrolize in the presence of alkaline. If desired, polyesters and polyacrylates or other unsaturated polymers can be used. Such polymers are well known in the art.

Part A preferably contains a mixture of a secondary diether diol and a lower polyalkylene glycol component. A lower polyalkylene glycol is meant to include polymers of glycols wherein the glycols have 2–10 carbon atoms. The secondary diether diol provides the backbone for the striping composition and is preferably a diether of propylene glycol and bisphenol A which is commercially available under the trademark DOW RESIN 565, a product of Dow Chemical Co. The lower polyalkylene glycol is preferably tripropylene glycol. The secondary diether diol is preferably present in an amount ranging from about 30–90% by weight based on the total reactant weight in part A, and more preferably about 50–80% by weight. At greater amounts of this component, the striping composition becomes too soft. The lower alkylene glycol can be present in an amount ranging from 10–70% by weight based on the total reactant weight in part A, and more preferably about 20–40% by weight. At greater amounts of this component, the striping composition becomes too brittle.

The Part B System

This invention contemplates the use of an isocyanate group-containing component (part B) capable of reacting with the isocyanate-reactive group-containing components contained in part A to provide a fast cure striping composition. The isocyanate group-containing component (part B) preferably contains polyisocyanates having a sufficient viscosity which will allow part B to be processed through road striping apparatus without the use of solvents. The polyisocyanates should be capable of reacting with the polyols in part A to form a polyurethane system which will not significantly amber over time.

Aliphatic and cycloaliphatic polyisocyanate are preferably used in part B because they tend to produce polyurethanes having decreased ambering. Generally, aliphatic and cycloaliphatic polyisocyanates which can be used in the present invention correspond to the formula

Q(NCO)$_n$ in which n is an integer 2 to 4, and Q represents an aliphatic hydrocarbon radical containing from 2 to 100 carbon atoms, and zero to 50 heteroatoms, or a cycloaliphatic hydrocarbon radical containing from 4 to 100 carbon atoms and zero to 50 heteroatoms. Examples of aliphatic and cycloaliphatic polyisocyanates include ethylene diisocyanate, 1,4-tetramethylene diisocyanate, 1,6-hexamethylene diisocyanate, trimethylhexamethylene diisocyanate, 1,12-dodecane diisocyanate, cyclobutane-1,3-diisocyanate, cyclohexane-1,3- and -1,4-diisocyanate and mixture of those isomers, and 1-isocyanate-3,3,5-trimethyl-5-isocyanatomethyl cyclohexane. Preferred aliphatic and cycloaliphatic polyisocyanates are hexamethylene diisocyanate, its isocyanurate and its biuret and 1-isocyanato-3,3,5-trimethyl-5-isocyanatomethyl cyclohexane (isophorone diisocyanate). More preferably, the polyisocyanate is trimerized hexamethylene diisocyanate (HDI), a trifunctional isocyanurate. A commercially available trimerized hexamethylene diisocyanate is sold under the trademark DESMODUR N-3300 by Miles, Inc.

The use of aliphatic or cycloaliphatic polyisocyanates as the only isocyanate group-containing components in part B can produce a system having a viscosity which is too high for convenient use in commercial road striping equipment. According to the present invention, it is possible to replace part of the aliphatic or cycloaliphatic polyisocyanate with an aromatic polyisocyanate. Aromatic polyisocyanates can be useful because they tend to have a viscosity decreasing effect when mixed with aliphatic or cycloaliphatic polyisocyanates and because they tend to react quickly. In addition, aromatic polyisocyanates tend to provide a faster reaction time and a harder finish. Aliphatic isocyanates tend to produce a softer polyurethane but are more light stable. Unfortunately, most aromatic polyisocyanates are brown and tend to produce yellow or brown polyurethanes. However, by using an aromatic polyisocyanate which is colorless or only very slightly colored, it is possible to produce a polyurethane which retains good amber resistant properties. One skilled in the art will readily appreciate that the aromatic polyisocyanate should be present in an amount sufficient to decrease the viscosity of part B so it can be processed through road striping equipment but within a range sufficient to prevent significant yellowing or ambering of the resulting polyurethane.

Diphenyl methane diisocyanate (e.g., diphenyl methane-2,4'- and/or -4,4'-diisocyanate) is a preferred aromatic polyisocyanate because it is very lightly colored. This aromatic polyisocyanate component is particularly advantageous because when it is combined with trimerized hexamethylene diisocyanate, a polyurethane resin can be produced which does not significantly amber. Diphenyl methane diisocyanate is commercially available under the trademark LUPRANATE MP-102 sold by BASF Corporation. Other colorless or lightly colored aromatic polyisocyanates can similarly be used. Aromatic polyisocyanates which might be colorless and, therefore, useful in the present invention include 2,4- and 2,6-hexahydrotolylene diisocyanate, hexahydro-1,3- and/or -4,4'-diphenyl methane diisocyanate, 1,3- and 1,4-phenylene diisocyanate, 2,4- and 2,6-tolylene diisocyanate, and naphthalene-1,5-diisocyanate.

The aliphatic polyisocyanate should be present in an amount of about 50–100% by weight based on the total weight of polyisocyantes in part B. Preferably, the aliphatic polyisocyanate is present in an amount of about 40–90% by weight, and more preferably 70–80% by weight. The aromatic polyisocyanate should be present in an amount of about 0–50% by weight based on the total weight of polyisocyanates in part B. Preferably, the aromatic polyisocyanate is present in an amount of about 5.0–40% by weight, and more preferably 10–20% by weight.

Part A and/or Part B can contain a catalyst or a mixture of catalysts capable of accelerating the cure rate of the polyurethane forming system. Desirably, the two-part polyurethane forming system cures in sufficient time to be considered a fast cure polyurethane. Any catalyst capable of accelerating the reaction rate between isocyanates and alcohols can be used in the present invention. Preferably, the catalyst is capable of accelerating the reaction between aliphatic and/or cycloaliphatic polyisocyanates and polyols. Exemplary catalysts are described in Squiller et al., "Catalysis In Aliphatic Isocyanate-Alcohol Reactions," Modern Paint And Coatings, June 1987. Such catalysts include stannous octoate, dibutyltin dilaurate, manganese octoate, zirconium octoate, cobalt octoate, lead octoate, bismuth stannate, lead stannate, zirconium octoate, zinc octoate, dibutyltin bis-O-phenylphenate, dibutyltin S,S-dibutyldithiocarbonate, triphenylantimony dichloride, dibutyltin maleate, stannous oxalate, stannous stearate, barium nitrate, cadmium octoate, dibutyltin diacetate, dibutyltin dilauryl mercaptide, DABCO catalyst, DBTDL and DABCO catalyst, bismuth stearate, lead stearate, dimethyltin dichloride, stannous napthenate and mixtures thereof. Dibutyltin dilaurate is a particularly preferred catalyst for use in the present invention because of its reliability for catalyzing polyurethanes.

The catalyst component is preferably incorporated into part A since the polyols are relatively unreactive until mixed with the polyisocyanate. The catalyst could be incorporated into part B but may have a tendency to accelerate the reaction between the isocyanate groups and atmospheric or trace water. Generally, the catalyst is incorporated into part A and/or part B in an amount sufficient to provide desired catalytic activity. One skilled in the art would readily appreciate the amount of catalyst necessary to provide catalytic activity. Generally, the catalyst should be present in an amount ranging from 0.1–10% by weight based on the total weight of the reacting components.

A high pressure pump lubricant can additionally be incorporated into part A and/or part B. Any known pump lubricant can be used, including phosphates. A particularly preferred lubricant is tricresyl phosphate sold under the tradename KRONITEX TCP by FLM Corp. Surprisingly, when this pump lubricant is incorporated into part B, it additionally acts as an anti-moisture agent thereby extending the pot life of part B. Although not intending to be bound by theory, it is believed that the vapor pressure of this agent creates a gas barrier over the polyisocyanates in part B thereby retarding access thereto by atmospheric moisture. Certainly, other pot life extending agents can be incorporated therein. Generally, the lubricant should be present in an amount ranging from about 0.1–5.0% by weight based on the total weight of the polyisocyantes in part B.

A heat dissipating additive can additionally be incorporated into part A and/or part B. Usually, it is easier to incorporate it into part A since part A is more stable. The heat dissipating additive can be any inert diluent. When used in part A, it can additionally provide compatibility between the polyol components. Preferably, the heat dissipating agent is a chlorinated aliphatic hydrocarbon resin such as, for example, CHLOROWAX 50 (chlorinated paraffinic plasticizer, chlorine content 48 wt. %, molecular weight 635), CHLOROWAX 60-70 (chlorinated paraffinic plasticizer, chlorine content 60 wt. %), and CHLOROWAX LV (paraffinic plasticizer, chlorine content 39 wt. %, molecular weight 545). Generally, the heat dissipating additive should be present in an amount ranging from about 1.0–20.0% by weight based on the total weight of the reacting components in the striping composition.

It is preferred for traffic-marking purposes (particularly highway marking) that striping compositions of this invention either contain or be combined with a reflectorizing filler such as glass or plastic beads or bubbles. The reflectorizing filler is used to provide increase retroreflectivity, particularly at night. The preferred reflectorizing additives are smooth, round, transparent glass spheres (e.g. beads), substantially free of milkiness, film scratch, pits, and air bubbles. Preferably, not more than 30% of the beads are ovate or imperfect.

It presently appears that the most effective application of the reflectorizing filler is to treat it as a third part (part C) which can be added to the part A/part B system before or after it has been applied to a road or highway surface. Generally, the reflectorizing filler is dropped onto the applied striping composition and becomes embedded therein. Accordingly, it is desirable for the striping composition to have an open time sufficient to receive the reflectorizing filler. A less effective manner of incorporating the reflectorizing filler into the part A/part B system is to mix them into the part A/part B mixture before it is applied to the road or highway surface. This latter approach is particularly undesirable if the reflectorizing filler is beads or bubbles which are easily fractured in a mixing step or if mixing is otherwise made more complicated by, for example, abrading the application equipment. The amount of reflectorizing filler to be incorporated into the striping composition can easily be determined by one skilled in the art based upon the desired degree of retroreflectivity and on the type of reflectorizing filler being used. Generally, the reflectorizing filler should be present in an amount ranging from 10–98% by weight of the total weight of the striping composition. Preferably, it is present in an amount ranging from 40–80% by weight of the total weight of the filler.

The two-part polyurethane forming system can contain additional components known in the art, if desired. Such additional components include, for example, diluents, pigments, plasticizers, leveling agents, surfactants, fillers, additives and the like. An exemplary pigment includes titanium dioxide which can be used as a whitener.

Formulation

Part A and part B are preferably combined prior to application to a road or highway surface. For example, parts A and B can be mixed in any commercial in-line static mixer or auger which are well known in the art. It is believed Graco Inc. manufactures equipment which can process the striping composition of the present invention. When applied to a road or highway surface, the striping composition can be applied in any desired thickness. The minimum thickness should be enough to provide adequate adhesion to the road or highway surface and sufficient visibility. The maximum thickness is determined according to economic considerations taking into account the cost of the starting materials and the potential increase in curing time to a thicker film to cure. Preferably, the film thickness is between about 1 to 100 mils (0.025–2.5 mm) and more preferably 5–25 mils, depending upon the amount of reflectorizing filler incorporated therein. Most commercial applications will provide a film thickness of about 10–15 mils.

The two-part striping composition preferably has a short pot life at room temperature (75° F.). Preferably, the pot life is less than about 4 minutes and more preferably less than about 1 minute. The pot life can be reduced by incorporating a higher percentage of aromatic polyisocyanate, using a different or greater amount of catalyst, heating or combinations thereof. Certainly, the rate of reaction between polyisocyanates and polyols additionally depends on the particular components used in the reaction in terms of the reactivities of the components, steric hinderance, etc., which would be understood by one skilled in the art.

The striping composition can be applied at room temperature. Alternatively, one or both parts can be heated prior to use to provide better flow properties and a faster cure time. Preferably, the two-part polyurethane forming system is heated to a temperature in the range of 80°–200° F. prior to application. More preferably, it is heated to a temperature in the range of 100°–150° F.

The ratio of part A to part B is preferably near 1:1 by volume, for example, between 0.97:1 and 1.05:1. One having skill in the art will readily appreciate that the proportion of part A to part B can be altered while staying within the spirit of the invention. It is desireable to have a slight excess of isocyanate groups. An excess of isocyanate groups of 1.05% is preferable in order to ensure that all of the hydroxyl groups of part A react. Excess isocyanate groups can usually react with water.

The resulting cured striping composition can be a thermoset and have a shore-D hardness of at least about 60, and more preferably at least about 75. The maximum shore-D hardness should be 100, and is preferably less than 90. If the striping composition is too hard, it becomes brittle. At lower harness levels, the striping composition will pick up dirt to easily. Thus, the striping composition is advantageous because it resists dirt and retains flexibility. The striping composition should have a high tensile strength and compression strength which allows it to take at least 10,000 psi. In addition, it should have sufficient abrasion resistance which allows it to withstand at least 1,000 cycles from a CS 17 wheel Tabor abrader, and preferably at least 50,000 cycles.

The invention will be further described with reference to the following specific examples which are not intended to limit the scope of invention.

EXAMPLE 1

The following formulation in Table 1 illustrates a two-part polyurethane forming system according to the present invention. Part A and part B were mixed together in a ratio of 1:1 by volume. The resulting mixture had a pot life of approximately one minute at 75° F.

TABLE 1

|  | Parts by Weight |
|---|---|
| Part A |  |
| DOW RESIN 565 | 70.0 |
| tripropylene glycol | 30.0 |
| titanium dioxide | 29.0 |
| CHLOROWAX LV | 11.1 |
| dibutyltin dilaurate | 04.0 |
| Part B |  |
| DESMODUR N-3300 | 114.0 |
| LUPRANATE MP102 | 36.0 |
| tricresyl phosphate | 1.4 |

The materials identified above by trademark have, according to their suppliers, the following chemical compositions.

"DOW RESIN 565": diether of propylene glycol and bisphenol A (the hydroxyl groups being secondary, available from Dow Chemical Company).

| Property | Value |
|---|---|
| hydroxyl equivalent weight | 175–185 |
| viscosity (60° C.) | 800–1700 cps |
| phenolic OH | 0.02% max. |
| color, Gardner | 5.0 max. |
| pounds/gallons (25° C.) | 9.2 |
| density (80°/4° C.) | 1.069 |

"CHLOROWAX LV": liquid chlorinated paraffin, molecular weight 545.0 (available from Occidental Chemical Corporation).

"DESMODUR N-3300": aliphatic polyisocyanate (available from Miles Inc. Coating Division).

"LUPRANATE MP102": 4,4' diphenyl methane diisocyanate (available from BASF Corp. Polymers Division).

EXAMPLE 2

Part A and part B described in Example 1 were applied to a road surface by spray application in a ratio of 1:1 by volume. The resulting film was white and cured sufficiently quickly (i.e., about 30 seconds) so that coning was not necessary. The cured striping composition adhered well to both asphalt and concrete surfaces, and should have a shore-D hardness in excess of 75 and not significantly yellow over time.

EXAMPLE 3

The process of example 1 was repeated and glass beads were dropped onto the combined striping composition before it cured, and became imbedded therein. The striping composition would be very reflective at night. The striping composition adhered well to both asphalt and concrete surfaces.

EXAMPLE 4

A striping composition according to the present invention can be prepared having the formulation identified in Table 2, wherein parts A and B can be mixed together in a ratio of 1.0:1.05 by volume.

TABLE 2

|  | Parts by Weight |
|---|---|
| Part A |  |
| DOW RESIN 565 | 90.0 |
| tripropylene glycol | 10.0 |
| titanium dioxide | 29.0 |
| CHLOROWAX LV | 11.1 |
| dibutyltin dilaurate | 04.0 |
| Part B |  |
| DESMODUR N-3300 | 60.0 |
| LUPRANATE MP102 | 40.0 |
| tricresyl phosphate | 1.4 |

EXAMPLE 5

A striping composition according to the present invention can be prepared having the formulation identified in Table 3, wherein parts A and B mixed together in a ratio of 0.97:1 by volume.

TABLE 3

|  | Parts by Weight |
|---|---|
| Part A |  |
| DOW RESIN 565 | 30.0 |
| tripropylene glycol | 70.0 |
| titanium dioxide | 29.0 |
| CHLOROWAX LV | 11.1 |
| dibutyltin dilaurate | 04.0 |
| Part B |  |
| DESMODUR N-3300 | 90.0 |
| LUPRANATE MP102 | 10.0 |
| tricresyl phosphate | 1.4 |

It should be apparent to those skilled in the art that various changes may be made to this invention without departing from the spirit thereof, and that the invention is not limited to what is described in the specification but only as indicated in the appended claims.

I claim:

1. A method for applying a reactive composition to a concrete surface, said method comprising the steps:
   (a) combining a first part comprising an isocyanate reactive group containing component and a second part comprising an isocyanate group containing component to form a reactive composition free of essentially volatile solvents having a boiling point below 150° C. at normal atmospheric pressure;

(b) applying said reactive composition to a concrete surface;

(c) allowing said reactive composition to cure and adhere to said concrete surface.

2. The method according to claim 1, wherein said combining step comprises mixing.

3. The method according to claim 1, wherein said combining step comprises spraying said first and second parts together.

4. The method according to claim 1, wherein said first part comprises a polyol selected from the group consisting of secondary diether polyols, alkylene glycols, polyalkylene glycols, and mixtures thereof.

5. The method according to claim 1, wherein said second part comprises an aliphatic polyisocyanate and an aromatic polyisocyanate.

6. The method according to claim 1, wherein said second part comprises trimerized hexamethylene diisocyanate.

7. The method according to claim 1, wherein said second part comprises diphenyl methane diisocyanate.

8. The method according to claim 1, wherein said first part comprises a mixture of a secondary diether diol and polyalkylene glycol.

9. The method according to claim 8, wherein said diether comprises a diether of propylene glycol and bisphenol A.

10. The method according to claim 1, wherein said second part further comprises a non-reactive lubricant capable of extending the pot life thereof compared with a second part not containing said non-reactive lubricant.

11. The method according to claim 1, wherein said first part further comprises a catalyst and a heat dissipating additive.

12. The method according to claim 1, wherein said composition will cure within four minutes after combining said first part and said second part.

13. The method according to claim 1, wherein said reactive composition cures and adheres to said concrete to provide a shore-D hardness of between about 60 and about 100.

14. The method according to claim 1, wherein said concrete surface comprises a road surface.

15. A method for applying a reactive composition to a concrete surface, said method comprising the steps:

(a) combining a first part comprising an amine and a second part comprising an isocyanate group containing component to form a reactive composition free of essentially volatile solvents having a boiling point below 150° C. at normal atmospheric pressure;

(b) applying said reactive composition to a concrete surface; and (c) allowing said reactive composition to cure and adhere to said concrete surface.

* * * * *

UNITED STATES PATENT AND TRADEMARK OFFICE
CERTIFICATE OF CORRECTION

PATENT NO. : 5,709,908

DATED : JANUARY 20, 1998

INVENTOR(S) : GURNEY

It is certified that error appears in the above-identified patent and that said Letters Patent is hereby corrected as shown below:

Column 1, lines 1 and 2 "STRIPPING" should read --STRIPING--.

Title page, [54] Title, line 1: "STRIPPING" should read --STRIPING--

Title page, [54] Title, line 2: "STRIPPING" should read --STRIPING--

Col. 4, line 40: "$\beta,\beta-$" should read --$\beta,\beta'-$--

Col. 8, line 61: "desireable" should read --desirable--

Signed and Sealed this

Twentieth Day of October, 1998

*Attest:*

BRUCE LEHMAN

*Attesting Officer*  Commissioner of Patents and Trademarks